United States Patent
Oliai

(10) Patent No.: US 8,694,420 B1
(45) Date of Patent: Apr. 8, 2014

(54) SYSTEM AND METHOD FOR OUTPUTTING A CREDIT RISK REPORT BASED ON DEBIT DATA

(75) Inventor: Stanley D. Oliai, La Verne, CA (US)

(73) Assignee: Experian Information Solutions, Inc., Coste Mesa, CA (US)

( * ) Notice: Subject to any disclaimer, the term of this patent is extended or adjusted under 35 U.S.C. 154(b) by 678 days.

(21) Appl. No.: 12/819,980

(22) Filed: Jun. 21, 2010

Related U.S. Application Data

(63) Continuation of application No. 10/044,117, filed on Jan. 10, 2002, now abandoned.

(60) Provisional application No. 60/337,921, filed on Dec. 5, 2001.

(51) Int. Cl.
*G06Q 40/00* (2012.01)

(52) U.S. Cl.
USPC .............................................. 705/38; 705/35

(58) Field of Classification Search
USPC .............................................. 705/14, 35, 38
See application file for complete search history.

(56) References Cited

U.S. PATENT DOCUMENTS

| | | | | | |
|---|---|---|---|---|---|
| 5,878,403 | A | * | 3/1999 | DeFrancesco et al. | 705/38 |
| 6,088,686 | A | * | 7/2000 | Walker et al. | 705/38 |
| 6,119,103 | A | * | 9/2000 | Basch et al. | 705/35 |
| 2002/0198824 | A1 | * | 12/2002 | Cook | 705/38 |
| 2003/0065563 | A1 | * | 4/2003 | Elliott et al. | 705/14 |

OTHER PUBLICATIONS

"Merriam-Webster's Collegiate Dictionary," 1999, Merriam-Webster, Incorporated, 10$^{th}$ edition, p. 79.*
"Merriam-Webster's Collegiate Dictionary," 1999, Merriam-Webster, Incorporated, 10th edition, p. 79.*

* cited by examiner

*Primary Examiner* — Samica L Norman
(74) *Attorney, Agent, or Firm* — Knobbe Martens Olson & Bear LLP

(57) ABSTRACT

An apparatus and method for utilizing debit data to report credit risk, the apparatus having an inquiry server, a credit database, a debit database and a scorecard database. The inquiry server generating a credit risk score and report based solely on credit data when sufficient, based on a combination of credit and data when credit data is present but insufficient, and based solely on debit data when no credit data is present.

11 Claims, 12 Drawing Sheets

Figure 7c

- Bank Name
- Check Number
- Check Amount

Non-Sufficient Funds Records 526

Figure 7f

- ABA Number
- Check Date
- Check Amount
- Paid Date
- Account Number
- Bank Name
- Merchant Name
- Driver's License Number
- Driver's License State Twice Bounced Check History 532

Figure 7b

- Bank Name
- Bank State
- Bank Zip Code
- Inquiry Date

Debit Inquiries Record 522

Figure 7e

- Bank Name
- Bank State and Zip
- Account Number
- Date of Closure
- Amount of Closure
- Reason for Closure
- Date Paid Closure Records 524

Figure 7a

- Name
- Address
- Date of Birth
- Home Phone
- Work Phone
- Social Security Number Consumer Identification Records 528

Figure 7d

- Name on Checks
- Address on Checks
- Bank Account on Checks
- Total Number Ordered
- Time Period Ordered Over Check Printing History 530

SYSTEM AND METHOD FOR OUTPUTTING A CREDIT RISK REPORT BASED ON DEBIT DATA

CROSS-REFERENCE TO RELATED APPLICATION

This application is a continuation of U.S. patent application Ser. No. 10/044,117, filed Jan. 10, 2002 now abandoned, which relates to the subject matter of Provisional Application Ser. No. 60/337,921 filed on Dec. 5, 2001, and titled "System and Method for Utilizing Debit Data to Predict Credit Worthiness."

BACKGROUND OF THE INVENTION

1. Field of the Invention

The present invention relates to a system and method for analyzing and scoring a consumer's credit worthiness and using the credit worthiness to approve or reject a business transaction. More particularly, to a system and method to use debit data in generating a credit worthiness report.

2. Description of Background Art

The practice of predicting a consumer's credit worthiness is well known. Conventional credit worthiness, or credit risk, analysis focuses on a consumer's credit history to determine whether a new line of credit should be offered or granted to the consumer. Typically, a consumer's credit history falls within three general categories: (1) trade-line, (2) public record, and (3) inquiry history. The first of these histories, trade-line, is a history of a consumer's actual use of credit, ranging from the amount and nature of credit lines in their name, to any potential defaults in payment. The public record history records data such as judgments against the consumer that may affect their credit, information related to liens, foreclosures, judgments, and bankruptcies. The third general category of credit history is the inquiry history. Inquiry history tracks the timing and amount of requests for credit by a consumer. This data may reflect on a consumer's sense of financial responsibility towards credit debt and ability to manage debt, as well as be an indicator of potential fraudulent activity.

Conventional credit risk analysis utilizes a risk model, or a scorecard to give a relative weight to each instance in the credit history to provide a credit-worthiness score. These models vary from provider to provider depending on the needs of the institution requesting the credit score. The methodology behind creating a risk model is well known in the art.

Institutions that request a consumer's credit-worthiness score do so for several reasons. First, institutions often pre-screen potential applicants to determine to whom they should mail a firm offer of credit, and at what terms. Typically, the institution will provide a score cut-off or tiered system for providing various terms and rates to different credit-worthiness score brackets. Pre-screening is used primarily to generate new business for the institution. Second, businesses use of the credit-worthiness score in granting real-time requests by a consumer for a line of credit. This may include applying for a home mortgage, buying a car, or opening a new credit card account at the point of sale. In these instances, the credit score is requested and compared against the institution's credit risk policy to determine whether the new line of credit will be provided.

As noted above, conventional credit risk scoring relies solely on credit history data to make its determination. The credit industry is always looking for additional predictors of credit risk. Additionally, there are many emerging consumers who are unable to secure a line of credit, notwithstanding their potential to be responsible credit holders. This class of consumers often are just starting out financially, and may include students, newly wed couples, recent immigrants or other consumers who never established credit in their own names before. There are generally two types of emerging consumers who are rejected for reasons not related to actual bad credit. The first type is typically known as the "no-hit" consumer. A "no-hit" consumer does not have any credit history whatsoever. These consumers are often rejected since no meaningful score can be generated for them purely based on a lack of information. The second type of rejected consumer is the "thin file" consumer. In this case, the consumer has some credit history in at least one of the three general categories, but there is not enough data to generate a sufficiently valid credit score. A specific type of "thin file" consumer is the "zero-trade" consumer. In this case the consumer has a public record and inquiry history, but has not yet secured a credit line and has no trade-line history. Many institutions do not accept a credit score that is not based in part on the trade-line history. Emerging consumers may represent two to thirty percent of any given industry market, and thus if accurately analyzed may provide a significant increase in a creditor's business.

Therefore there is a need for a system which (1) identifies an alternate reliable source of data for assessing credit risk, (2) outputs to a credit-provider a credit-worthiness score and report based solely on the alternate data when the consumer falls into the no-hit or thin-file categories, and (3) outputs to a credit-provider a credit-worthiness score and report based on a combination of the credit history and alternate data when the consumer is a zero-trade consumer, or when specifically requested by the credit-provider.

SUMMARY OF THE INVENTION

A method and apparatus for utilizing debit data to predict credit worthiness and to output a corresponding score and report is described. In one embodiment, the apparatus comprises an inquiry server to receive a user inquiry, coupled to a debit database, a credit database, and a scorecard database. The inquiry server is configured to combine data from the debit and credit databases with a scorecard to generate and output a score and report regarding a consumer's credit worthiness.

In another embodiment the system comprises a request parser, a credit qualifier, a credit data retrieval module, a debit data retrieval module, a scorecard selector, a credit-only scorecard retrieval module, a score generator, a user profile retrieval module, and a report and score formatter. The request parser receives a user inquiry and determines whether a specific scorecard is requested, or if the best available score is requested. The data retrieval modules each retrieve requested data from a respective database as required. When the best available score is requested the credit qualifier and scorecard selector examine the credit data retrieved to determine whether debit data should be retrieved as well as which scorecard should be retrieved. The scorecard generator receives the credit and debit data as required and applies a metric in the scorecard to generate a credit-worthiness score. The user profile retrieval module retrieves user-specific preferences relating to the format of the data and score to be output in a credit-worthiness report. The report and score formatter receives the user-specific preferences, the credit and debit data as required, and the score. The report and score formatter further receives any formatting requests from the user request and generates the credit-worthiness report combining all requested data and the credit-worthiness score. The apparatus then outputs the credit-worthiness report to the user who initially made the request.

The present invention also includes a method for generating and outputting a credit-worthiness score and report including the steps of: receiving a credit data, determining whether a credit data is sufficient, receiving a debit data when the credit data is not sufficient, selecting a hybrid scorecard when the credit data is present but not sufficient, generating a credit-worthiness score based on applying the hybrid scorecard to the debit and credit data when the hybrid scorecard is selected, and outputting the credit risk report, including the credit-worthiness score to the user.

BRIEF DESCRIPTION OF THE DRAWINGS

The invention is illustrated by way of example, and not by way of limitation in the figures of the accompanying drawings in which like reference numerals refer to similar elements.

FIGS. 7a-7f each illustrate the data elements contained within a single debit data record.

DETAILED DESCRIPTION OF THE PREFERRED EMBODIMENTS

Figure 1:
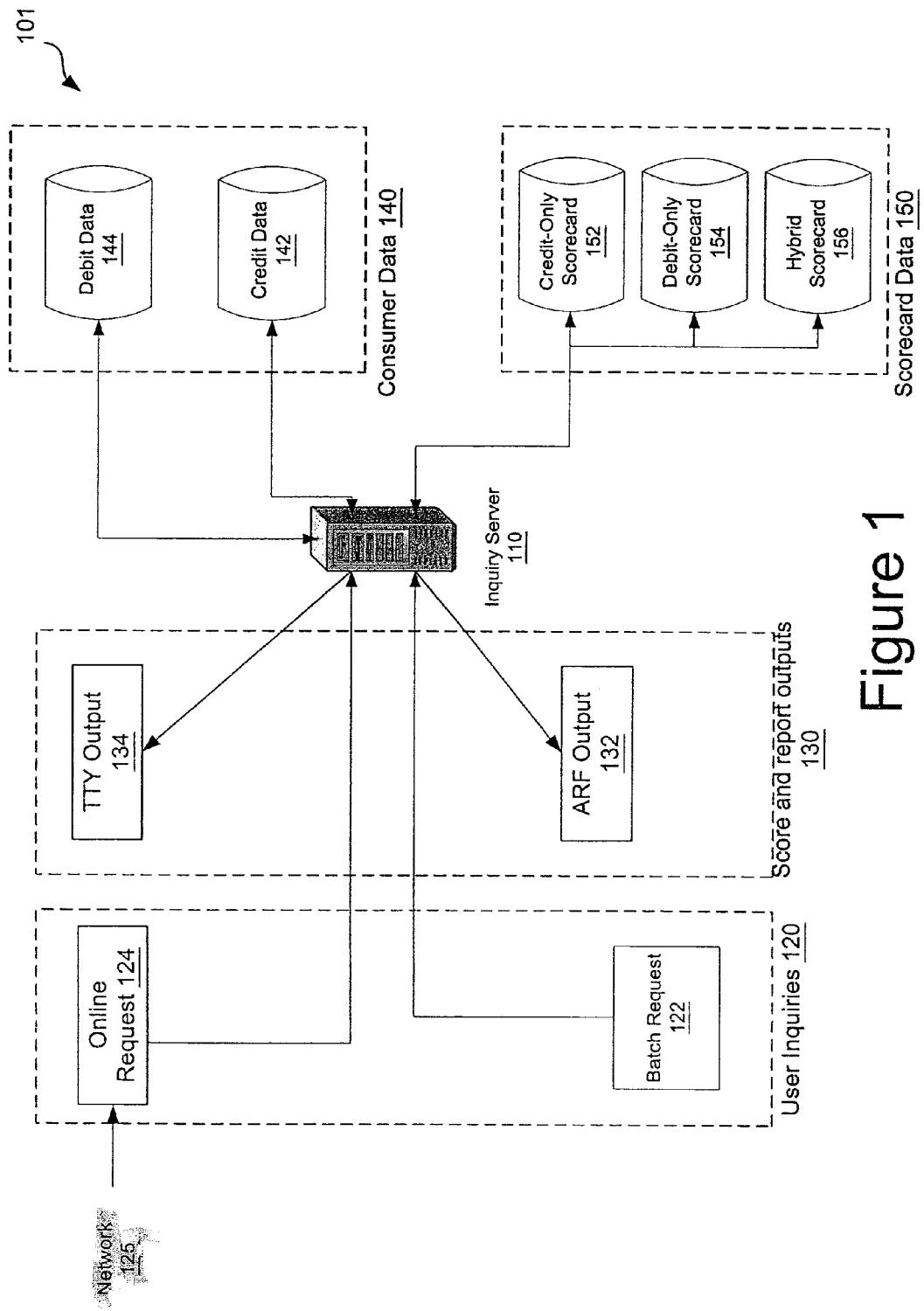
FIG. 1 illustrates a block diagram overview of one embodiment of a system for utilizing debit data to predict credit worthiness.

A system and method for outputting a credit risk report based on a combination of debit and credit data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram overview of one embodiment of a system 101 for utilizing debit data to predict credit worthiness and to generate and output a corresponding score and report. Generally, embodiment 101 includes an inquiry server 110 that receives user inquiries 120 and outputs a score and report output 130. In order to generate score and report output 130, inquiry server 110 also receives a consumer data 140 and a scorecard data 150. In a preferred embodiment, inquiry server 110 receives all data and inputs via any commonly known network environment. Inquiry server 110 also outputs the score and report output 130 via the network environment. This facilitates the centralization and segmentation of the system 101 for ease of maintenance and accessibility. One skilled in the art will recognize that other communication topologies may exist which still fall within the spirit of the invention. For example, the inquiry server 110, consumer data 140, scorecard data 150, as well as the inquiries 120 and outputs 130 may all reside or originate locally in one general purpose computer system.

User inquiries 120 are requests by credit providers, such as banks or utility companies for information, and more specifically a score, concerning a consumer's credit worthiness. A user inquiry 120 may include any distinguishing identifier of a consumer. In one embodiment, the distinguishing identifier may be the consumer's social security number, or the consumer's name of record. Additionally, user inquiry 120 may include specific instructions as to what type of score is requested, as well as specific instructions regarding the format and content of the report outputted. Credit providers use credit worthiness scores and reports to evaluate the general level of risk a credit-provider would incur when offering the consumer a line of credit. User inquiries 120 usually take one of two forms. First, user inquiries 120 may come from a batch request 122. A batch request 122 is typically several individual user inquiries processed together as a combined request. Each included user inquiry is a request for score and information on a different consumer. Typically, a batch request 122 is used to pre-screen potential applicants for credit worthiness to facilitate mass-mailing an firm offer of credit to them. Batch requests 122 are also used by credit providers who prefer to submit several requests at once, be it for pricing or convenience reasons. Aside from pre-screen requests, batch requests 122 may take the form of account reviews or online batch requests as well.

A second type of user inquiry 120 is the on-line or real-time request 124. An on-line request 124 is generated by a credit provider in response to a request for credit from a consumer. As such, on-line requests 124 typically request information and score on a single consumer. Usually an on-line request is transmitted across a network environment 125 to inquiry server 110, but as noted above, it may be entered directly into a general purpose computer serving as any or all of the system 101. One skilled in the art will recognize that other particular forms of user inquiries 120 are also possible without exceeding the scope of the present invention.

As noted above, inquire server 110 outputs a credit worthiness score and report output 130 in response to the user inquiry 120. Generally, there are two primary formats commonly used in the art today for providing this output. The first is a teletype (TTY) output 134, and the second is an automated response format (ARF) 132 typically used when the system utilizes a network environment and is not self-contained. Both formats provide the same score and information and are provided here as preferred examples of possible formats available in the art.

Inquiry server 110 receives consumer data 140 in the course of responding to user inquiries 120. Consumer data 140 includes information related to a consumer's credit worthiness. Traditionally, this information has been restricted to the use of only credit data 142. The present invention advantageously expands the scope of available consumer data 140 by also utilizing information related to demand deposit accounts, referred to here as debit data 144. A more detailed discussion of the particular types of information available in each data set 142, 144 can be found below with respect to FIGS. 5 and 7a through 7f.

Inquiry server 110 also receives a scorecard data 150. Scorecard data 150 includes one or more scorecards for use by the inquiry server 110. Generally, each scorecard provides a metric for the inquiry server 110 to weigh information contained in consumer data 140 to generate the credit worthiness score. The present invention advantageously provides a system for utilizing both credit-only and debit-only scorecards 152, 154 as well as a hybrid scorecard 156 which provides a metric for a score based on both credit and debit data 142, 144.

Overview

The system 101 operates as follows. A user inquiry 120 is generated by a user typically in response to a request for credit by a consumer or as part of a mass-mailing campaign. The user inquiry 120 is received by inquiry server 110. Inquiry server 110 accesses consumer data 140 to retrieve pertinent credit data 142 related to the particular consumer identified in the user inquiry 120. If the credit data 142 contains sufficient information on the consumer, inquiry server 110 retrieves the credit-only scorecard 152 from scorecard data 150. If the consumer has a "thin file" or is a "no-hit", then inquiry server 110 retrieves the debit data 144 related to that consumer. If the debit data 144 is retrieved, inquiry server further chooses either the debit-only scorecard 154 (in no-hit situations) or the hybrid scorecard 156 (in zero-trade situations) for retrieval from scorecard data 150. Alternatively, a user may request the hybrid scorecard 156 even when a rich credit history is available. Once the consumer data 140 and scorecard data 150 are both retrieved, inquiry server 110 applies the metric of the selected scorecard data 150 to the retrieved consumer data 140 to generate the score and report output 130 in response to user inquiry 120.

Inquiry Server

Figure 2:
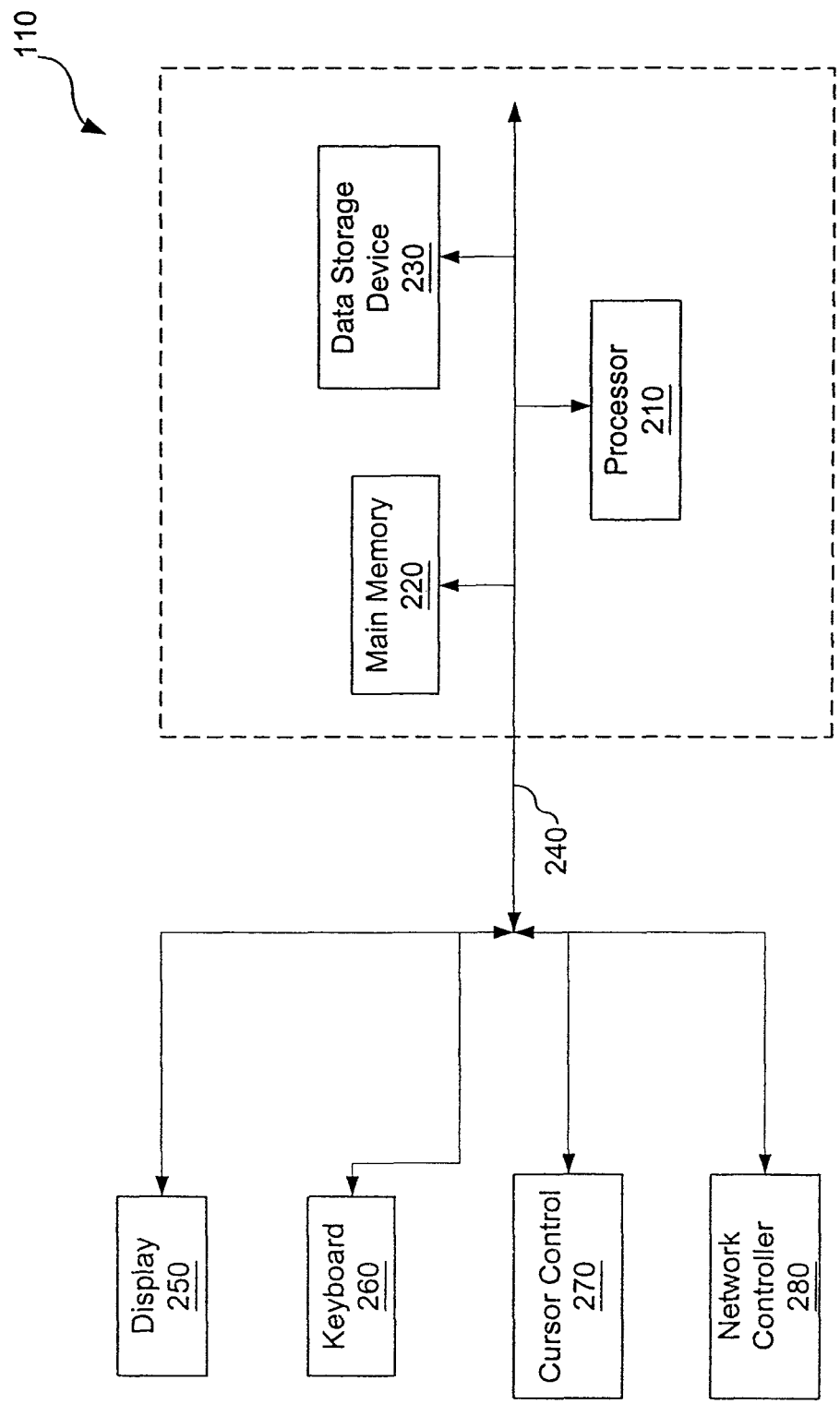
FIG. 2 illustrates a block diagram of a preferred embodiment of the architecture of the inquiry server.

FIG. 2 illustrates a block diagram of a preferred embodiment of inquiry server 110. Inquiry server 110 preferably includes a processor 210, a main memory 220, and a data storage device 230, all of which are communicatively coupled to a system bus 240.

Processor 210 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 220 may store instructions and/or data that may be executed by processor 210. The instructions and/or data may comprise code for performing any and/or all of the techniques described herein. Main memory 220 may be a dynamic random access memory (DRAM) device, a static random access memory (SRAM) device, or some other memory device known in the art.

Data storage device 230 stores data and instructions for processor 210 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 240 represents a shared bus for communicating information and data throughout inquiry server 110. System bus 240 may represent one or more buses including an industry standard architecture (ISA) bus, a peripheral component interconnect (PCI) bus, a universal serial bus (USB), or some other bus known in the art to provide similar functionality.

Additional components that may be coupled to inquiry server 110 through system bus 240 include a display device 250, a keyboard 260, a cursor control device 270, and a network controller 280. Display device 250 represents any device equipped to display electronic images and data to a local user or maintainer. Display device 250 may be a cathode ray tube (CRT), a liquid crystal display (LCD), or any other similarly equipped display device, screen, or monitor. Keyboard 260 represents an alphanumeric input device coupled to inquiry server 110 to communicate information and command selections to processor 210. Cursor control device 270 represents a user input device equipped to communicate positional data as well as commend selections to processor 210. Cursor control device 270 may include a mouse, a trackball, a stylus, a pen, cursor direction keys, or other mechanisms to cause movement of a cursor. Network controller 280 links inquiry server 110 to a network that may include multiple processing systems. The network of processing systems may comprise a local area network (LAN), a wide area network (WAN) (e.g., the Internet), and/or any other interconnected data path across which multiple devices may communicate.

It should be apparent to one skilled in the art that inquiry server 110 may include more or less components than those shown in FIG. 2 without departing from the spirit and scope of the present invention. For example, inquiry server 110 may include additional memory, such as, for example, a first or second level cache, or one or more application specific integrated circuits (ASICs). As noted above, inquiry server 110 may be comprised solely of ASICs. In addition, components may be coupled to inquiry server 110 including, for example, image scanning devices, digital still or video cameras, or other devices that may or may not be equipped to capture and/or download electronic data to/from inquiry server 110.

Figure 3:
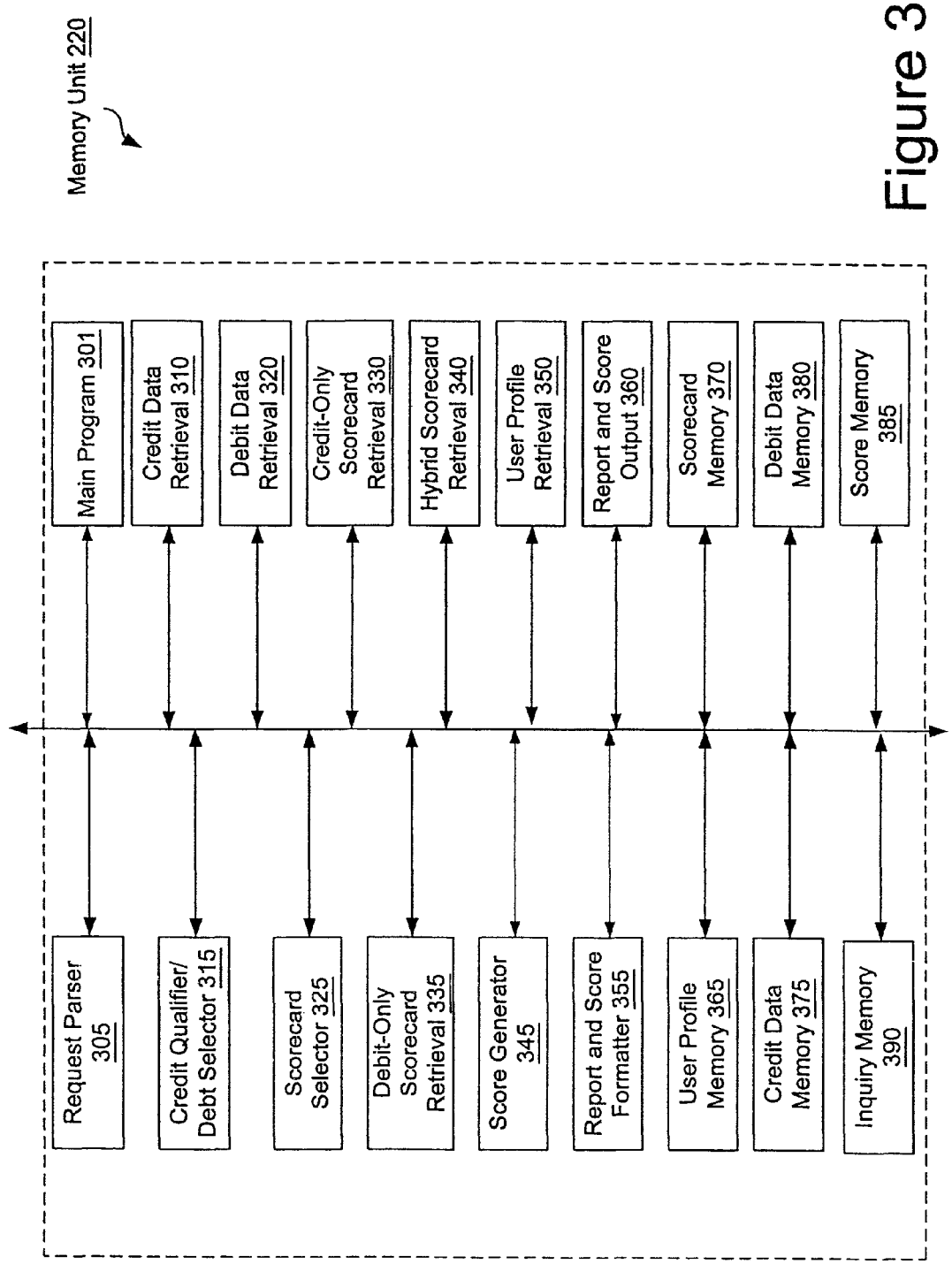
FIG. 3 illustrates a more detailed block diagram of the contents of the memory unit in FIG. 2.

FIG. 3 is a block diagram of memory unit 220. Generally, memory unit 220 contains several code modules for responding to user inquiries 120 and generating a credit worthiness score and report output 130. Memory unit 220 also contains several memory cells for storing various bytes of data required by the operation of the code modules. Specifically, the code modules contained in memory unit 220 include: a main program 301, a request parser 305, a credit data retrieval module 310, a credit data qualifier and debit data selector 315, a debit data retrieval module 320, a scorecard selector 325, a credit-only scorecard retrieval module 330, a debit-only scorecard retrieval module 335, a hybrid scorecard retrieval module 340, a score generator 345, a user profile retrieval module 350, a report and score formatter 355, and a report and score output module 360.

Memory unit 220 also includes several data storage memories for use by various code modules. Specifically, memory unit 220 includes a user profile memory 365, a scorecard memory 370, a credit data memory 375, a debit data memory 380, a score memory 385, and an inquiry memory 390.

Figure 4:
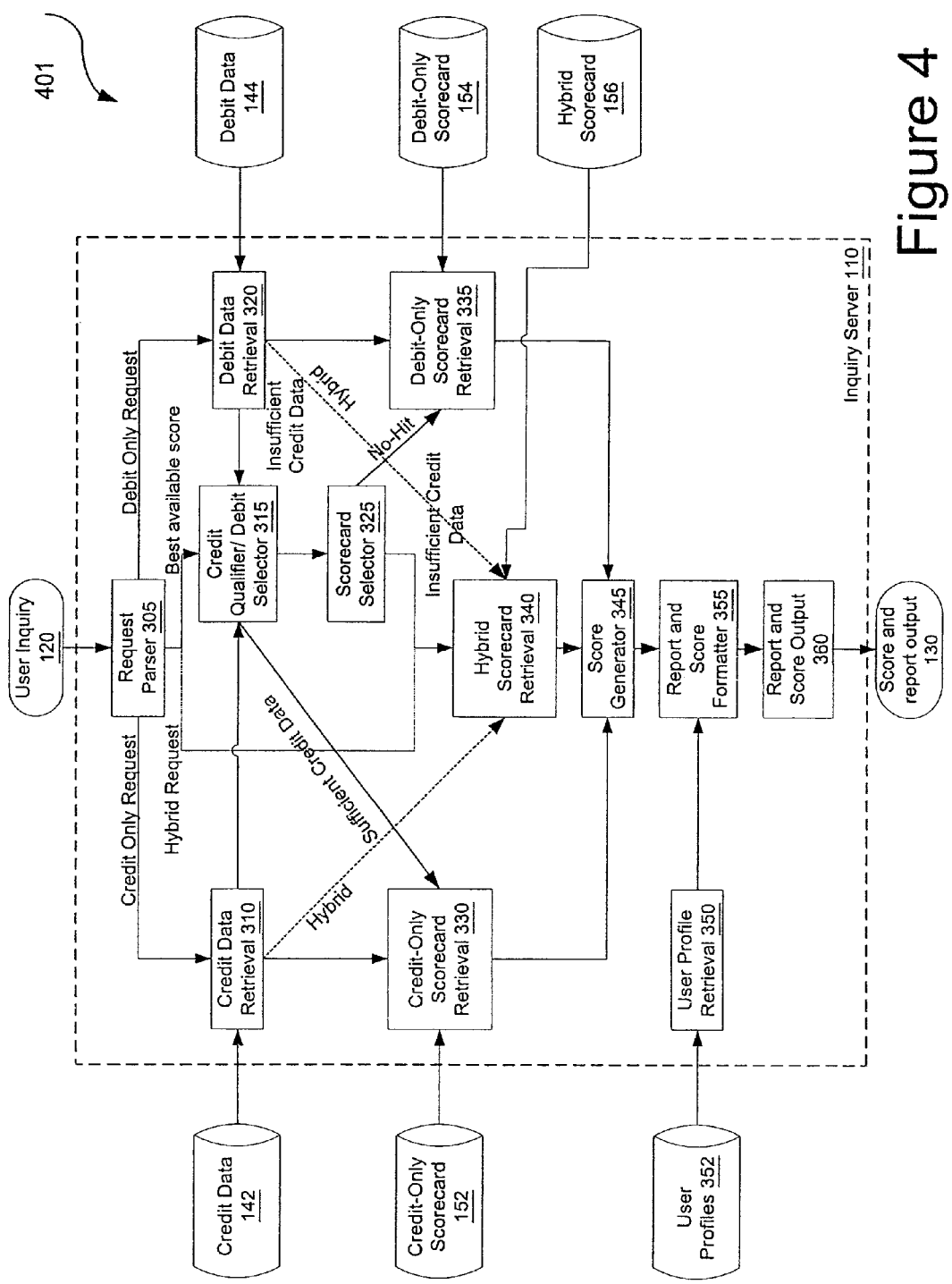
FIG. 4 illustrates a block diagram of the process flow in the inquiry server according to the present invention.

The operation of memories 365, 370, 375, 380, 385, 390 and code modules 301, 305, 310, 315, 320, 325, 330, 335, 340, 345, 350, 355, 360 in memory unit 220 is best shown in FIG. 4. FIG. 4 illustrates a diagram of a preferred embodiment 401 of the process flow of the various code modules and memories 301, 305, 310, 315, 320, 325, 330, 335, 340, 345, 350, 355, 360, 365, 370, 375, 380, 385, 390 in memory unit 220. All code modules and memories 305, 310, 315, 320, 325, 330, 335, 340, 345, 350, 355, 360, 365, 370, 375, 380, 385, 390 are communicatively coupled with main program 301 (not shown). Main program 301 (not shown) centrally controls the operation and process flow of inquiry server 110, transmitting instructions and data as well as receiving data from each module and memory 305, 310, 315, 320, 325, 330, 335, 340, 345, 350, 355, 360, 365, 370, 375, 380, 385, 390. The arrows illustrated in FIG. 4 reflect the various possible process flows dictated by main program 301 (not shown). Additionally, request parser 305 is configured to receive user inquiry 120, credit data retrieval module 310 is Configured to receive credit data 142, debit data retrieval module 320 is configured to receive debit data 144, credit-only scorecard retrieval module 330 is configured to receive credit-only scorecard 152, debit-only scorecard retrieval module 335 is configured to receive debit-only scorecard 154, hybrid scorecard retrieval module 340 is configured to receive hybrid scorecard 156, user profile retrieval is configured to receive user profile 352, and report and score output module 360 is configured to output score and report output 130.

The system operates as follows. The user inquiry 120 is received by inquiry server 110 and is communicated to request parser 305. Request parser 305 parses user inquiry 120 for instructions on what type of score and report is requested by the user. The four categories of scores and reports a user inquiry 120 may request are: (1) credit-only, (2) debit-only, (3) hybrid, or (4) a score and report based on the best data available. In the preferred embodiment, there exists a preference order for the selection of data to be used. If the user inquiry 120 does not contain specific instructions on what type of score and report to produce, the system produces a score and report based on the best data available. The best data available option operates as follows: when sufficient credit data 142 exists for a given consumer, the credit-only scorecard 152 is used, if a consumer has a "thin" or zero-trade credit history, the hybrid scorecard 156 is preferred, and when the consumer is a "no-hit", having no credit history, the debit-only scorecard 154 is used. An alternate embodiment of the best available score prefers the use of the hybrid score even when a sufficient credit history is available. Most user inquiries 120 utilize this preference order when requesting a score and report. However, as noted above, a user may specifically request any of the scorecards 152, 154, 156 specifically. In the case where a specific scorecard request is not supported by adequate data, no valid score is returned. Each of the above-mentioned scenarios will be discussed separately, beginning with a user inquiry 120 request for a credit-only score and report.

Credit-Only Score and Report Request

Upon receiving a user inquiry 120 for a credit-only score and report, request parser 305 notifies main program 301 (not shown) of both the type of score and report requested, any unique consumer identifiers e.g. formal name or social security number, and any specific report formatting requests. The consumer identifiers, and formatting requests are stored in inquiry memory 390. Main program 301 (not shown) requests the credit data 142 associated with the consumer identifier to be retrieved by credit data retrieval module 310. Main program 301 (not shown) receives the credit data 142 and stores it in credit data memory 375 (not shown) for later use. Next, main program 301 (not shown) requests the credit-only scorecard 152 be retrieved by credit-only scorecard retrieval module 330 and stores the scorecard in scorecard memory 370 (not shown). Main program 301 (not shown) provides score generator 345 with the credit data 142 and credit-only scorecard 152 in credit data-memory 375 (not shown) and scorecard memory 370 (not shown). Score generator 345 applies the metric provided by credit-only scorecard 152 to the credit data 142 to return a credit-only credit worthiness score to main program 301 (not shown) to be stored in score memory 385 (not shown). Main program 301 (not shown) instructs user profile retrieval module 350 to retrieve a user profile 352 related to the consumer identifier in user inquiry 120 and stores it in user profile memory cell 365. The user profile 352 may contain general formatting parameters for all of a user's user inquiries 120. These formatting parameters may denote what raw data to include in the report as well as the physical presentation of the data and score. The score, credit data 142, and user profile 352 are retrieved from their respective memories 385, 375, 365 and are communicated to report and score formatter 355. Main program 301 (not shown) also relays any specific formatting requests from inquiry memory 390 (not shown) to report and score formatter. Report and score formatter 355 combines the specific formatting requests with the formatting parameters from user profile 352 to form a full set of formatting parameters. Report and score applies the formatting requests to the credit data 142, and to the score to form a complete report and score. As noted above, the report may include elements of credit data 142 which may have been used in computing the score. Many times these individual elements are required by users to help explain the major factors resulting in the returned score. The report and score are communicated to the report and score output module 360 via main program 301 (not shown). Report and score output module 360 handles all communication protocols for the physical delivery of the score and report output 130 to the user.

Debit-Only Score and Report Request

A user inquiry 120 requesting a debit-only score and report is processed similarly. Upon receiving a user inquiry 120 for a debit-only score and report, request parser 305 notifies main program 301 (not shown) of both the type of score and report requested, any unique consumer identifiers e.g. formal name or social security number, and any specific report formatting requests. The consumer identifiers, and formatting requests are stored in inquiry memory 390. Main program 301 (not shown) requests the debit data 144 associated with the consumer identifier to be retrieved by debit data retrieval module 320. Main program 301 (not shown) receives the debit data 144 and stores it in debit data memory 380 (not shown) for later use. Next, main program 301 (not shown) requests the debit-only scorecard 154 be retrieved by debit-only scorecard retrieval module 335 and stores the scorecard in scorecard memory 370 (not shown). Main program 301 (not shown) provides score generator 345 with the debit data 144 and debit-only scorecard 154 from debit data memory 380 (not shown) and scorecard memory 370 (not shown), respectively. Score generator 345 applies the metric provided by debit-only scorecard 154 to the debit data 144 to return a debit-only credit worthiness score to main program 301 (not shown) to be stored in score memory 385 (not shown). Main program 301 (not shown) instructs user profile retrieval module 350 to retrieve a user profile 352 related to the consumer identifier in user inquiry 120 and stores it in user profile memory cell 365. The user profile 352 may contain general formatting parameters for all of a user's user inquiries 120. These formatting parameters may denote what raw data to include in the report as well as the physical presentation of the data and score. The score, debit data 144, and user profile 352 are retrieved from their respective memories 385, 380, 365 and are communicated to report and score formatter 355. Main program 301 (not shown) also relays any specific formatting requests from inquiry memory 390 (not shown) to report and score formatter. Report and score formatter 355 combines the specific formatting requests with the formatting parameters from user profile 352 to form a full set of formatting parameters. Report and score applies the formatting requests to the debit data 144, and to the score to form a complete report and score. As noted above, the report may include elements of debit data 144 which may have been used in computing the score. Many times these individual elements are required by users to help explain the major factors resulting in the returned score. The report and score are communicated to the report and score output module 360 via main program 301 (not shown). Report and score output module 360 handles all communication protocols for the physical delivery of the score and report output 130 to the user.

Hybrid Score and Report Request

A hybrid score and report request is similarly processed. As an initial note FIG. 4 illustrates the first steps of the process for a hybrid score and report request with dash lines, this is merely to distinguish from the process flow of the best-available request. Upon receiving a user inquiry 120 for a hybrid score and report, request parser 305 notifies main program 301 (not shown) of both the type of score and report requested, any unique consumer identifiers e.g. formal name or social security number, and any specific report formatting requests. The consumer identifiers, and formatting requests are stored in inquiry memory 390. Main program 301 (not shown) requests the credit data 142 associated with the consumer identifier to be retrieved by credit data retrieval module 310, and the debit data 144 associated with the consumer identifier to be retrieved by debit data retrieval module 320. Main program 301 (not shown) receives the credit data 142 and the debit data 144 and stores them in credit data memory 375 (not shown) and debit data memory 380 (not shown) respectively, for later use. Next, main program 301 (not shown) requests the hybrid scorecard 156 be retrieved by hybrid scorecard retrieval module 340 and stores the scorecard in scorecard memory 370 (not shown). Main program 301 (not shown) provides score generator 345 with the credit and debit data 142, 144 and hybrid scorecard 156 from data memories 375, 380 (not shown) and scorecard memory 370 (not shown). Score generator 345 applies the metric provided by hybrid scorecard 156 to the credit and debit data 142, 144 to return a hybrid credit worthiness score to main program 301 (not shown) to be stored in score memory 385 (not shown). Main program 301 (not shown) instructs user profile retrieval module 350 to retrieve a user profile 352 related to the consumer identifier in user inquiry 120 and stores it in user profile memory cell 365. The user profile 352 may contain general formatting parameters for all of a user's user inquiries 120. These formatting parameters may denote what raw data to include in the report as well as the physical presentation of the data and score. The score, credit data 142, debit data 144, and user profile 352 are retrieved from their respective memories 385, 375, 380, 365 and are communicated to report and score formatter 355. Main program 301 (not shown) also relays any specific formatting requests from inquiry memory 390 (not shown) to report and score formatter. Report and score formatter 355 combines the specific formatting requests with the formatting parameters from user profile 352 to form a full set of formatting parameters. Report and score applies the formatting requests to the credit data 142, debit data 144, and to the score to form a complete report and score. As noted above, the report may include elements of credit and debit data 142, 144 which may have been used in computing the score. Many times these individual elements are required by users to help explain the major factors resulting in the returned score. The report and score are communicated to the report and score output module 360 via main program 301 (not shown). Report and score output module 360 handles all communication protocols for the physical delivery of the score and report output 130 to the user.

Best Available Data Score and Report Request

The final possible scenario arises when the user inquiry 120 wants a credit-worthiness score and report based on the best available data. Upon receiving a user inquiry 120 for a best available data score and report, request parser 305 notifies main program 301 (not shown) of both the type of score and report requested, any unique consumer identifiers e.g. formal name or social security number, and any specific report formatting requests. The consumer identifiers, and formatting requests are stored in inquiry memory 390. Main program 301 (not shown) requests the credit data 142 associated with the consumer identifier to be retrieved by credit data retrieval module 310. Main program 301 (not shown) receives the credit data 142 and stores it in credit data memory 375 (not shown) for later use. Main program 301 (not shown) sends the received credit data 142 to credit qualifier/debit selector 315. Credit qualifier/debit selector 315 analyzes credit data 142 to determine whether sufficient data exists to generate a valid credit-only score and report.

If a valid credit-only score and report can be generated, main program 301 (not shown) instructs credit-only scorecard retrieval module 330 to retrieve credit-only scorecard 152 and stores it in scorecard memory 370 (not shown).

If a valid credit-only score cannot be generated, main program 301 (not shown) instructs debit data retrieval module 320 to retrieve debit data 144 relating to the consumer identification. Main program 301 (not shown) stores the returned debit data 144 in debit data memory 380 (not shown). Main program 301 (not shown) next passes the credit data 142 in credit data memory 275 (not shown) to scorecard selector 325. Scorecard selector 325 determines the nature of the deficiency in credit data 142 and returns the determination to main program 301 (not shown). If no credit data 142 exists for the identified consumer (i.e. a no-hit) main program 301 (not shown) instructs the debit-only scorecard retrieval module 335 to retrieve debit-only scorecard 154 and stores it in scorecard memory 370 (not shown). If some credit data 142 exists, but it is insufficient to produce a valid credit-only score and report, main program 301 (not shown) instructs hybrid scorecard retrieval module 340 to retrieve hybrid scorecard 156 and stores it in scorecard memory 370 (not shown).

Main program 301 (not shown) provides score generator 345 with the appropriate credit and debit data 142, 144, from data memories 375, 380 (not shown), and the scorecard stored in scorecard memory 370 (not shown). Score generator 345 applies the metric provided by selected scorecard to the appropriate credit and/or debit data 142, 144 to return a credit worthiness score to main program 301 (not shown) to be stored in score memory 385 (not shown). Main program 301 (not shown) instructs user profile retrieval module 350 to retrieve a user profile 352 related to the consumer identifier in user inquiry 120 and stores it in user profile memory cell 365. The user profile 352 may contain general formatting parameters for all of a user's user inquiries 120. These formatting parameters may denote what raw data to include in the report as well as the physical presentation of the data and score. The score, credit data 142 (as required), debit data 144 (as required), and user profile 352 are retrieved from their respective memories 385, 375, 380, 365 and are communicated to report and score formatter 355. Main program 301 (not shown) also relays any specific formatting requests from inquiry memory 390 (not shown) to report and score formatter. Report and score formatter 355 combines the specific formatting requests with the formatting parameters from user profile 352 to form a full set of formatting parameters. Report and score applies the formatting requests to the credit data 142 (as required), debit data 144 (as required), and to the score to form a complete report and score. As noted above, the report may include elements of credit and/or debit data 142, 144 which may have been used in computing the score. Many times these individual elements are required by users to help explain the major factors resulting in the returned score. For more information regarding when the credit or debit data 142, 144 are required, please see the discussion of the first three score and report requests above. The report and score are communicated to the report and score output module 360 via main program 301 (not shown). Report and score output module 360 handles all communication protocols for the physical delivery of the score and report output 130 to the user.

Figure 5:
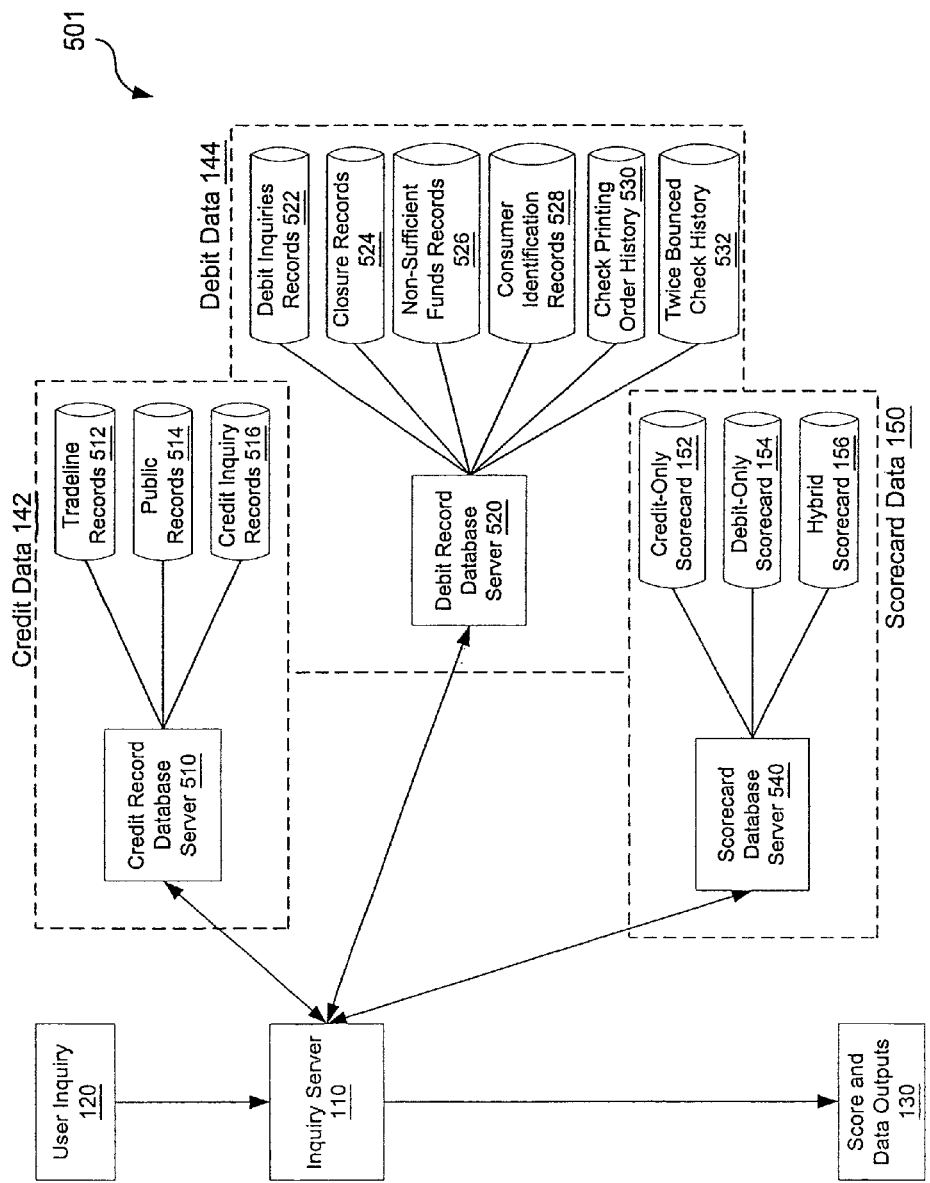
FIG. 5 illustrates a block diagram showing a preferred embodiment of the invention in a networked environment utilizing several database servers to provide consumer and scorecard data.

FIG. 5 illustrates a block diagram showing a preferred embodiment of the system 501 in a networked environment utilizing several database servers to provide credit data 142, debit data 144, and scorecard data 150. The preferred embodiment of the system 501 includes inquiry server 110, a credit record database server 510, a debit record database server 520, and a scorecard database server 540. Inquiry server 110 is communicatively coupled to credit record database server 510, debit record database server 520, and scorecard database server 540. Inquiry server 110 also receives user inquires 120, and outputs score and report outputs 130.

Credit record database server 510 is also communicatively coupled to trade-line records 512, public records 514, and credit inquiry records 516, together forming the credit data 142 as noted above. Trade-line records 512 include information on consumers related to previous lines of credit ranging from home equity loans to utility payments. Public records 514 include information on consumers related to matters of public record including bankruptcy filings, foreclosures and judgments against the consumer. Credit inquiry records 516 include information on consumers related to previous attempts by the consumer to secure a new line of credit.

Debit record database server 510 is communicatively coupled to a debit inquiries records 522, a closure records 524, a non-sufficient funds records 526, a consumer identification records 528, a check printing order history 530, and a twice bounced check history 532, together forming debit data 144. In one embodiment, debit record database server 510 and data records 522-532 are maintained by eFunds Corporation of Phoenix, Ariz., as part of their DebitBureau service. Unlike credit data 142, debit data 144 relates to information regarding consumers' demand deposit account habits. The type of information contained in each record will be discussed in more detail with respect to FIGS. 7a through 7f below; what follows here is a general overview of each type of record. Debit inquiries records 522 include information on consumers related to the timing and number of requests to open a new debit account, or demand deposit account. Closure records 524 include information on consumers related to debit accounts which have been closed for cause. Non-sufficient funds records 526 include information on consumers related to any overdrawing of a debit account. Consumer identification records 528 include information on consumers related to tracking consumer's current and past identification and contact information. Check printing order history 530 includes information on consumers related to the number of checks ordered, and thus used for each debit account held. Finally, twice bounced check history 532 includes information on consumers related to "bounced" checks presented twice to retailers.

Scorecard database server 540 is communicatively coupled to the credit-only scorecard 152, the debit-only scorecard 154, and the hybrid scorecard 156; together forming scorecard data 150.

Database servers 510, 520, and 540 are of a type of data server commonly known in the art. Various protocols may be used to communicate with the database servers 510, 520, 540 to affect the request for data, or query. One commonly known example in the art is the simple query language protocol (SQL). One skilled in the art will recognize that any number of query protocols exist and may be used without exceeding the scope and spirit of this invention. Once the query is received, the credit record database server 510 searches the trade-line record 512, public records 514, and credit inquiry records 516 for any data that pertains to the identified consumer. This information is then communicated back to the inquiry server 110.

Depending on the specific data requirements of the user inquiry 120 and the quality of credit data 142 returned from the credit record database server 510, inquiry server 110 may also send a query across the network to the debit record database server 520 to obtain any pertinent debit data 144 relating to the consumer. As noted above, many protocols may exist for communicating the query with the debit record database server 520, and may not even be the same protocol as used when communicating with the credit record database server 510. Debit record database server 520 receives the query and searches the debit records 522-532 for data related to the consumer identified in the query. Any data found is communicated back to the inquiry server 110.

Once the inquiry server 110 has received the requested credit data 142, and debit data 144 as required, the inquiry server 110 determines which scorecard is required to generate the requested credit-worthiness score. Inquiry server 110 formulates a query for the required scorecard and communicates the query across the network to the scorecard database server 540. As noted above, several protocols may be used to affect the communication. Scorecard database server 540 searches the scorecards 152-156 for the correct scorecard and returns the correct scorecard data 150 to the inquiry server 110. Inquiry server 110 then applies the metric of the scorecard data 150 to the credit and debit data 142, 144 as required, to generate the credit-worthiness score. The score is combined with any raw data requested by the user inquiry 120 and communicated back across the network to the user as the score and report outputs 130.

Figure 6:
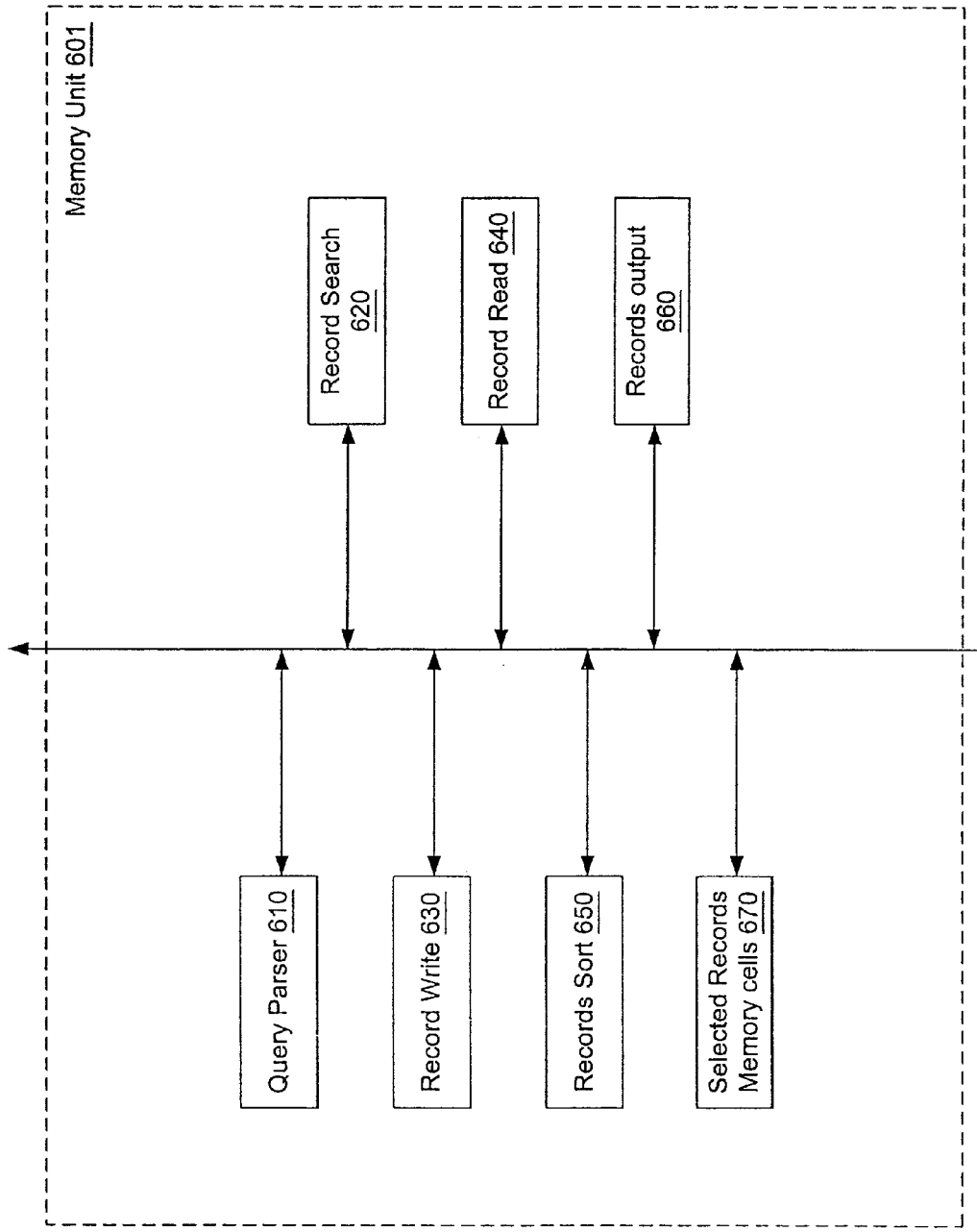
FIG. 6 illustrates a block diagram of the contents of a database server memory unit.

While each database server, 510, 520, 540 handles different records, each has a similar structure and memory composition, and for ease of discussion, a generic database server 550 (not shown) will be discussed. One skilled in the art will recognize that the discussion of the generic database server is equally applicable to each of the database server 510, 520, 540. Database server 550 shares the same general architecture as inquiry server 110. Therefore, the discussion of FIG. 2 also applies to the general arrangement and structure of database server 550. FIG. 6 is a diagram of the memory contents of a representative memory unit 601 within database server 550, which corresponds to main memory 220 of FIG. 2.

Memory unit 601 includes a query parser 610, a record search module 620, a record write module 630, a record read module 640, a records sort module 650, a records output module 660, and a selected records memory 670. Query parser 610 receives and interprets queries from the inquiry server 110. As noted in the discussion of FIG. 5, query parser 610 may be configured to communicate in one of several different protocol languages. Query parser 610 may also be configured to communicate in several different languages to provide a greater flexibility. Once the desired operation (read or write) is determined by the query parser 610, record search module 620 looks for desired records, record write module 630 creates any new records required, and record read module 640 reads into selected records memory 670 any records identified by record search module 620. To aid in the searching (620) and writing (630) of records, memory unit 601 also includes records sort module 650 to provide a more efficient organization of the data in the records. Finally, if data is requested by the query, records output module 660 communicates the contents of selected records memory 670 back across the network to the inquiry server 110.

FIGS. 7a through 7f each illustrate the data elements contained within a single debit data record 522-532. FIG. 7a illustrates the data elements contained within a consumer identification record 528. Consumer identification records 528 include information on consumers related to tracking consumer's current and past identification and contact information where available. This information may include the current and past names, addresses, date of birth, home phone numbers, work phone numbers, and social security numbers. FIG. 7b illustrates the data elements contained within a inquiries record 522. Debit inquiries records 522 include available information on consumers related to the timing and number of requests to open a new debit account, or checking account. This information may include the bank name, bank state, bank zip code, and inquiry date for each request by a consumer to open a new debit account. FIG. 7c illustrates the data elements contained within a non-sufficient funds records 526. Non-sufficient funds records 526 include information on consumers related to overdrawing a debit account where available. This information may include the bank name, check number and check amount for each check written by a consumer that cannot be cleared due to a lack of funds within the account. FIG. 7d illustrates the data elements contained within a check printing order history 530. Check printing order history 530 includes available information on consumers related to the number of checks ordered, and thus used for each debit account held. This information may include the name, address, bank account listed on each set of checks as well as the total number of checks ordered and the time span in which they were ordered. FIG. 7e illustrates the data elements contained within a closure record 524. Closure records 524 include any available information on consumers related to debit accounts that have been closed for cause. This information may include the bank name, state and zip code, the account number, date, amount due and reason for closure and the date paid for each debit account which was closed for cause. Finally, FIG. 7f illustrates the data elements contained within a twice bounced check history 532. Twice bounced check history 532 includes available information on consumers related to "bounced" checks presented to retailers twice. This information typically includes the ABA number for each check bounced, the date the check was submitted for payment, the amount of the check, the date the amount was paid, the account the check was drawn against, the name of the bank servicing the account, the name of the merchant receiving the check, and the driver's license number and state associated with each check. While the preferred embodiment has been described as having very specific debit data records 522-532, each containing very specific data elements, one skilled in the art will recognize that other debit data information may exist which would be useful in computing a more accurate credit-worthiness score and may be incorporated with or in substitution for the listed records and elements above without exceeding the scope or spirit of the present invention.

Figure 8A:
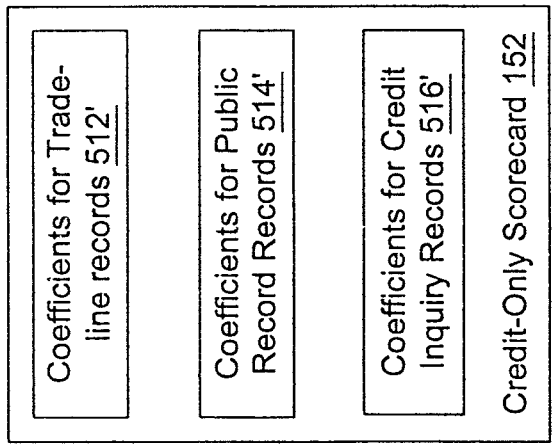
FIGS. 8a-8c each illustrate the coefficients contained within each type of scorecard.
Figure 8B:
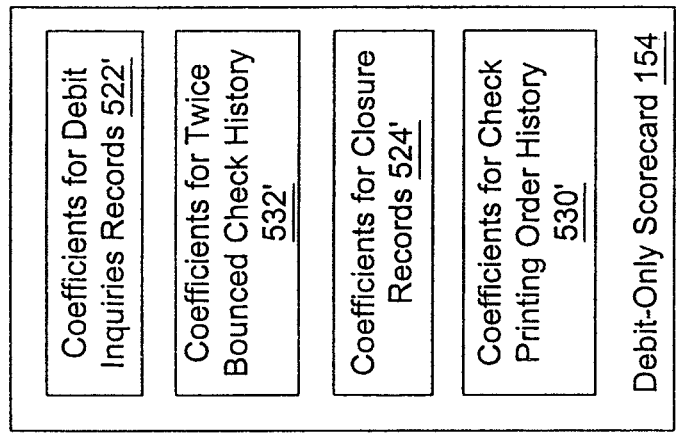
Figure 8C:
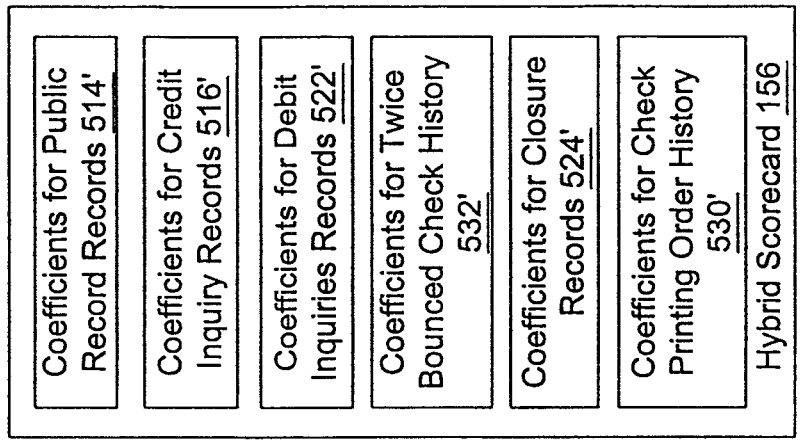

FIGS. 8a through 8c illustrate the elements in a preferred embodiment of the scorecard data 150. As noted above, the scorecards provide a metric for the inquiry server 110 to evaluate the credit and debit data to generate a credit-worthiness score. The use of credit-only scorecards 152 is well known in the art, and while the data evaluated may be different for the debit-only scorecard 154 and hybrid scorecard 156, the process of utilizing these scorecards is similar. A person skilled in the art will recognize that techniques for generating and applying credit-only scorecards are equally applicable to the debit-only and hybrid scorecards without exceeding the scope or spirit of the present invention. What follows will be a brief description of specific classes of coefficients in a preferred embodiment of each scorecard as well as a discussion of how the scorecards are applied to the data. In the preferred embodiment, each scorecard 152, 154, 156 provides the inquiry server 110 with a set of coefficients, or relative weights, for each type of record present in the related data 142, 144. The coefficients are typically generated utilizing statistical methodologies commonly known in the art.

FIG. 8a illustrates the elements of the credit-only scorecard 152. As noted above, credit-only scorecards 152 are well known in the art. In the preferred embodiment, the credit-only scorecard 152 includes a set of coefficients for trade-line records 512', a set of coefficients for public record records 514', and a set of coefficients for credit inquiry records 516'. FIG. 8b illustrates the elements of the debit-only scorecard 154. In the preferred embodiment, the debit-only scorecard 154 includes a set of coefficients for debit inquiries records 522', a set of coefficients for twice bounced check history 532, a set of coefficients for closure records 524', and a set of coefficients for check printing order history 530'. FIG. 8c illustrates the elements of the hybrid scorecard 156. In the preferred embodiment, the hybrid scorecard 156 includes a set of coefficients for public record records 514', a set of coefficients for credit inquiry records 516', a set of coefficients for debit inquiries records 522', a set of coefficients for twice bounced check history 532, a set of coefficients for closure records 524', and a set of coefficients for check printing order history 530'. In an alternate embodiment, hybrid scorecard 156 may also include a set of coefficients for trade-line records.

The scorecards 152, 154, 156 operate as follows. As noted above each scorecard 152, 154, 156 includes a set of coefficients for various data elements contained in the record comprising the credit data 142 and debit data 144. Inquiry server 110 receives one of the three scorecards 152, 154, 156 and applies the coefficients to the related data retrieved from the credit and debit data 142, 144. Each coefficient is used to give a relative weight to its related data element, if present. These relative weights are added together to generate the credit-worthiness score. The higher the credit-worthiness score, the lower the risk associated with that consumer. In the preferred embodiment, the debit-only and hybrid scorecards 154, 156 are correlated to each other to provide a consistent predictor of credit worthiness, represented by a similar numerical value, regardless of which data 142, 144 and scorecard 154, 156 are used.

Figure 9:
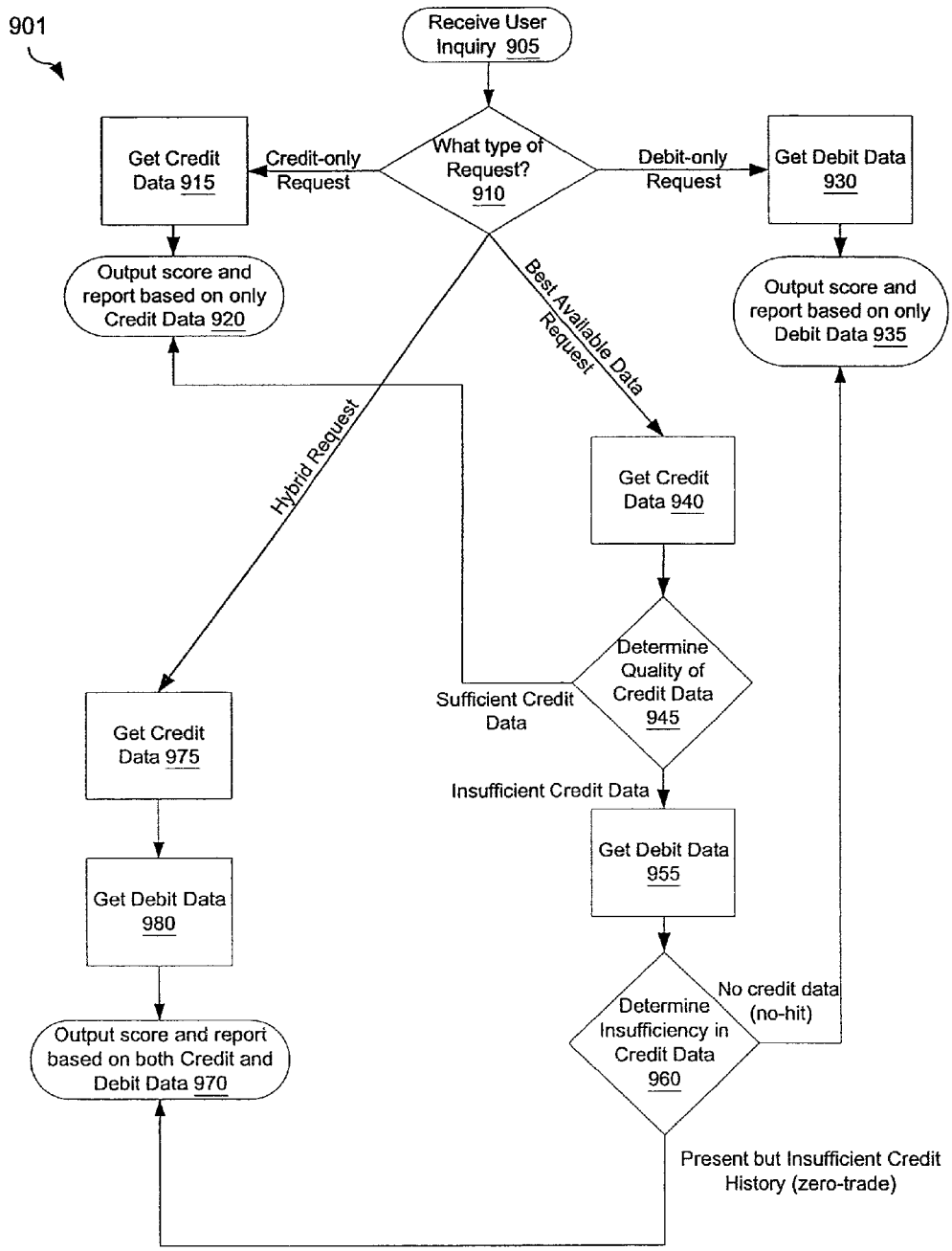
FIG. 9 illustrates a flow chart of a preferred embodiment of a method for determining a credit-worthiness score utilizing a combination of credit and debit data.

FIG. 9 illustrates a flowchart of a method 901 for determining a credit-worthiness score utilizing a combination of credit and debit data. Reference numerals have been provided in parenthesis to relate each step to a component of specific embodiment 401. In method 901 a user inquiry (120) is received 905 and the type of request received is determined 910 (305). In the preferred embodiment, there are four possible requests: (1) a credit-only score and report based on credit data alone, (2) a debit-only score and report based on debit data alone, (3) a hybrid score and report based on both credit and debit data, and (4) a score and report based on the best available data. If the request asks for a credit-worthiness score based solely on credit data (142) then the credit data (142) is retrieved 915 (310) and a score and report are output 920 (345, 355, 360) based solely on the credit data (142). If the request asks for a credit-worthiness score based solely on debit data (144) then the debit data (144) is retrieved 930 (320) and a score and report are output 935 (345, 355, 360) based solely on the debit data (144). If the request asks for a hybrid credit-worthiness score, then the credit data (142) is retrieved 975 (310), and the debit data (144) is also retrieved 980 (320). A score and report are output 970 (345, 355, 360) based on both the credit and debit data (142, 144).

The fourth path is followed when the request asks for a credit-worthiness score based on the best available data. First the credit data (142) is retrieved 940 (310). The received credit data is analyzed 945 (315) to determine whether sufficient credit data exists to generate a valid credit-only score. The sufficiency determination focuses on the sufficiency of a trade-line record (512) in the credit data (142), but may also include other credit data thresholds. If the credit data is sufficient, i.e. primarily whether there is sufficient trade-line data for the consumer, and a hybrid score is not requested, then a score and report are output 920 based solely on credit data (142). However, if the credit data is insufficient, then any relevant debit data (144) is retrieved 955 (320). The insufficiency of the credit data (142) is examined 960 and if no credit data at all exists, a no-hit, then a score and report are output 935 based solely on the debit data (144). However, if some credit data (142) is present, but not enough to generate a valid credit-only score, a zero-trade, or the hybrid score is requested, then a score and report are output 970 (345, 355, 360) based on a combination of credit and debit data.

Figure 10:
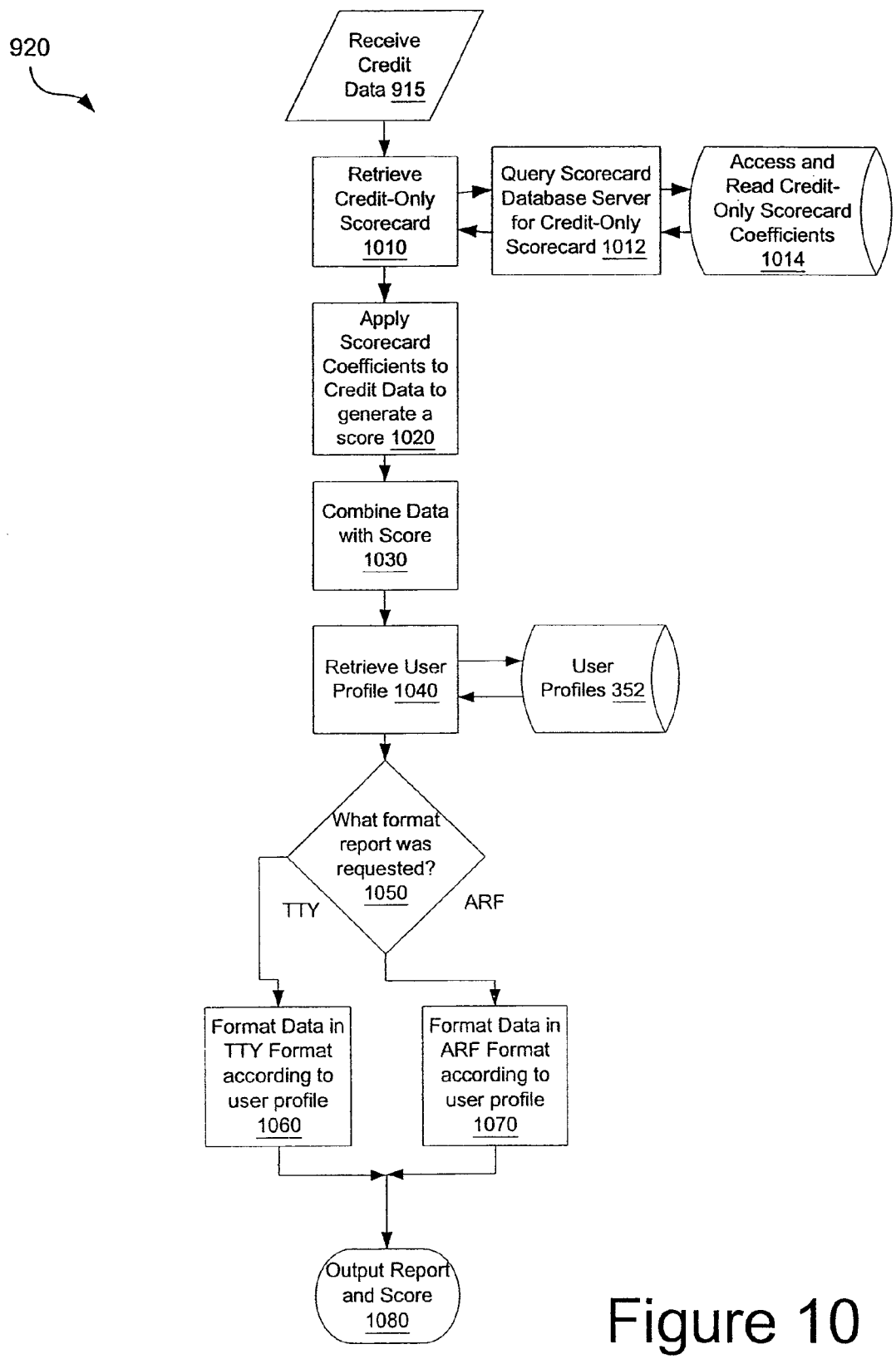
FIG. 10 illustrates a flow chart of a preferred embodiment of a method for generating the output of a score and report based solely on credit data.

FIG. 10 is a flow diagram for the output of the score and report based solely on credit data (142). First, the credit data (142) is received 915 (310). Next, a credit-only scorecard (152) is retrieved 1010. This is accomplished by querying 1012 a scorecard database server (540) for the credit-only scorecard (152). The scorecard database server (540) in turn accesses and returns 1014 the credit-only scorecard (152). The scorecard metric is applied to the credit data to generate 1020 the credit-worthiness score. The score is then combined 1030 with the unprocessed credit data (142). In order to determine which elements of the data are required to be output to the user, a user profile 352 is retrieved 1040. The user profile 352 acts as a data filter as well as determines what transmission format the report will take 1050. In the preferred embodiment the two formats are a teletype (TTY) format (134) and an automated response format (ARF, 132). If the TTY format is designated then the filtered data and score are formatted into a report according to the TTY standards 1060 and the resulting report is output 1080 (130) to the user. If the ARF format is designated then the filtered data and score are formatted into a report according to the ARF standard 1070 and the resulting report is output 1080 (130) to the user.

Figure 11:
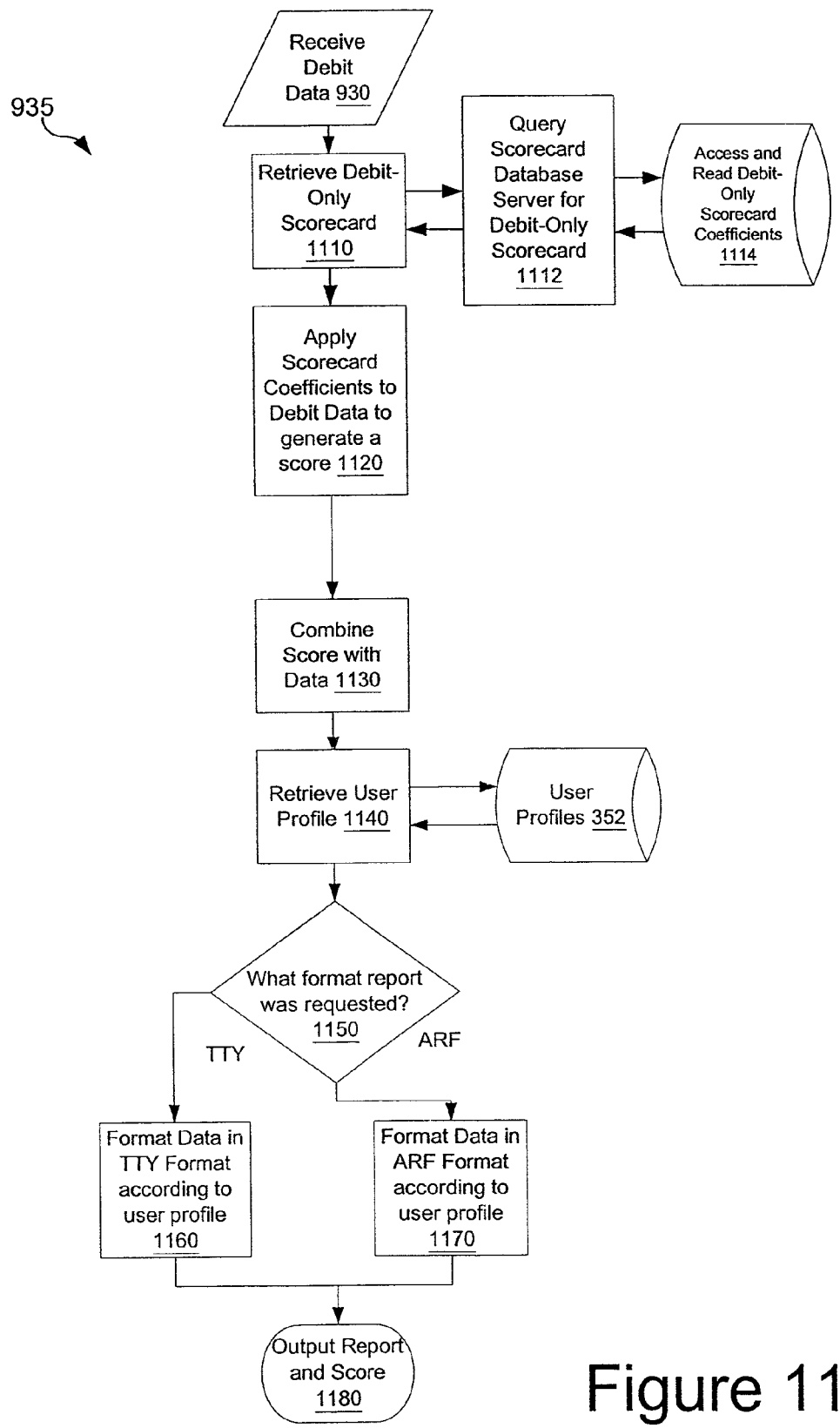
FIG. 11 illustrates a flow chart of a preferred embodiment of a method for generating the output of a score and report based solely on debit data.

FIG. 11 is a flow diagram for the output of the score and report based solely on debit data (144). First, the debit data (144) is received 930 (320). Next, a debit-only scorecard (154) is retrieved 1110. This is accomplished by querying 1112 a scorecard database server (540) for the debit-only scorecard (154). The scorecard database server (540) in turn accesses and returns 1114 the debit-only scorecard (154). The metric of the scorecard is applied to the debit data to generate 1120 the credit-worthiness score. The score is then combined 1130 with the unprocessed debit data (144). In order to determine which elements of the data are required to be output to the user, a user profile 352 is retrieved 1140. The user profile 352 acts as a data filter as well as determines what transmission format the report will take 1150. In the preferred embodiment the two formats are a teletype (TTY) format (134) and an automated response format (ARF, 132). If the TTY format is designated then the filtered data and score are formatted into a report according to the TTY standards 1160 and the resulting score is output 1180 (130) to the user. If the ARF format is designated then the filtered data and score are formatted into a report according to the ARF standard 1170 and the resulting report is output 1180 (130) to the user.

Figure 12:
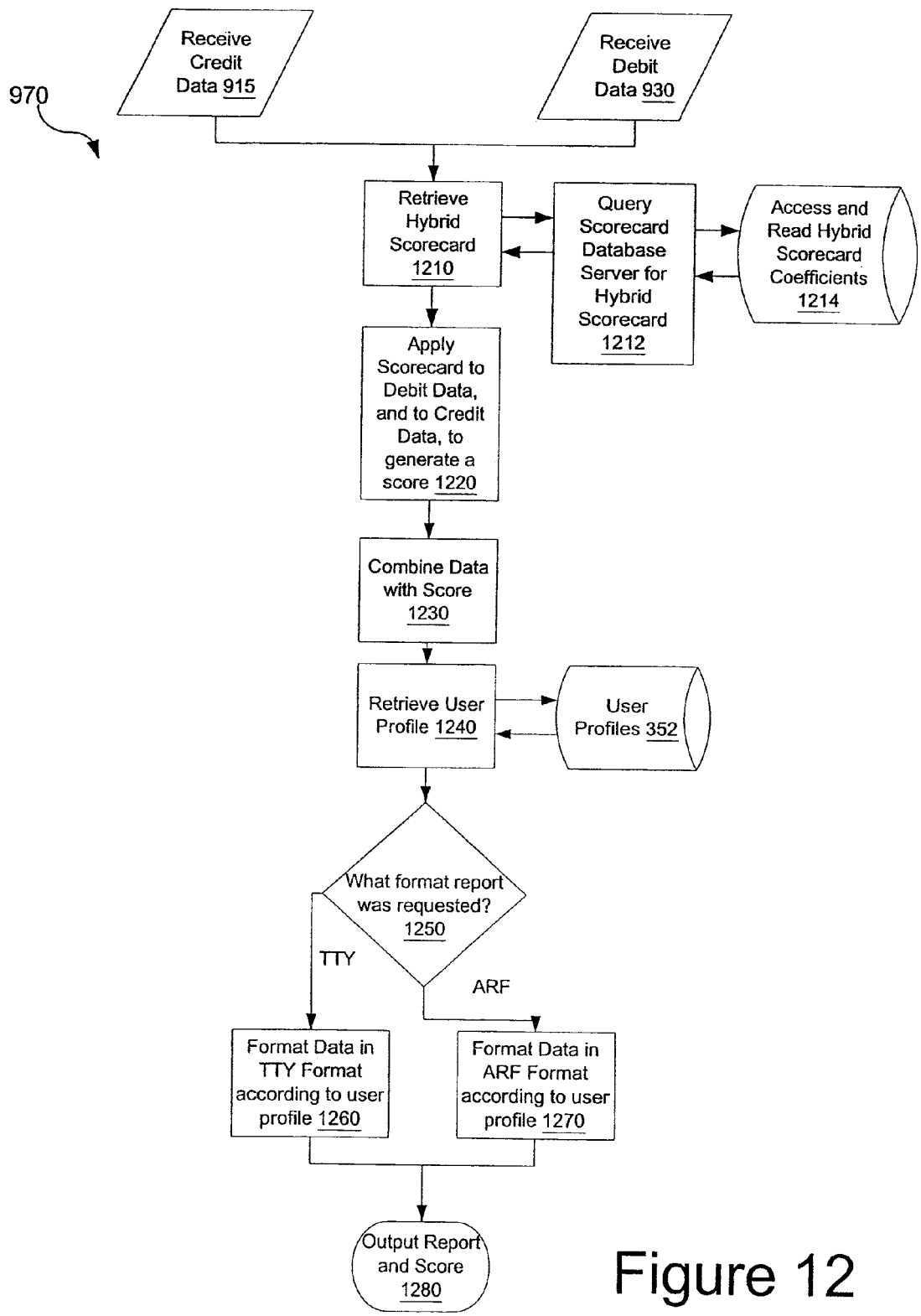
FIG. 12 illustrates a flow chart of a preferred embodiment of a method for generating the output of a score and report based on a combination of credit and debit data.

FIG. 12 is a flow diagram for the output of the score and report based on both credit data (142) and debit data (144). First, the credit data (142) and debit data (144) are received 915, 930. Next, a hybrid scorecard (156) is retrieved 1210. This is accomplished by querying 1212 a scorecard database server (540) for the hybrid scorecard (154). The scorecard database server (540) in turn accesses and returns 1214 the hybrid scorecard (154). The metric of the scorecard is applied to both the credit data and the debit data to generate 1220 the credit-worthiness score. In the preferred embodiment, the metric of the scorecard is applied to any credit inquiry and public records, as well as all relevant debit data related to the consumer. The score is then combined 1230 with the unprocessed credit and debit data (142, 144). In order to determine which elements of the data are required to be output to the user, a user profile 352 is retrieved 1240. The user profile 352 acts as a data filter as well as determines what transmission format the report will take 1250. In the preferred embodiment the two formats are a teletype (TTY) format (134) and an automated response format (ARF, 132). If the TTY format is designated then the filtered data and score are formatted into a report according to the TTY standards 1260 and the resulting report is output 1280 (130) to the user. If the ARF format is designated then the filtered data and score are formatted into a report according to the ARF standard 1270 and the resulting report is output 1280 (130) to the user.

Although the invention has been described in considerable detail with reference to certain embodiments thereof, other embodiments are possible. Therefore, the scope of appended claims should not be limited to the description of the preferred embodiments contained herein.

The invention claimed is:

1. A method for generating a credit risk report comprising:
accessing computer-executable instructions from at least one computer-readable storage medium; and
executing the computer-executable instructions, thereby causing computer hardware comprising at least one computer processor to perform operations comprising:
receiving financial data about a consumer, wherein the financial data comprises at least credit data or debit data;
assessing the financial data;
selecting, based at least in part on the assessing of the financial data, a scorecard for generating a credit-worthiness score, wherein the scorecard is selected from one of a first scorecard that generates a credit-worthiness score based on credit data without reference to debit data, a second scorecard that generates a credit-worthiness score based on debit data without reference to credit data, and a third scorecard that generates a credit-worthiness score based on both credit data and debit data;
generating a credit-worthiness score by applying the financial data to the selected scorecard; and
providing a credit risk report that comprises the credit-worthiness score.

2. The method of claim 1 wherein the operation of providing the credit risk report comprises additional operations performed by computer hardware, including:
receiving a user profile indicating a format and a content for the credit risk report;
selecting a credit or debit data element indicated in the user profile;
combining the selected data element with the credit-worthiness score to generate the credit risk report;
formatting the credit risk report according to the user profile; and
outputting the credit risk report.

3. The method of claim 1 wherein the operation of providing the credit risk report comprises formatting the credit risk report in a TTY format.

4. The method of claim 1 wherein the operation of providing the credit risk report comprises formatting the credit risk report in an ARF format.

5. The method of claim 1 wherein the operation of receiving the financial data comprises:
determining a selection criteria for selecting the financial data to be received;
providing the selection criteria to a financial database server; and
receiving the financial data from the financial database server related to the selection criteria.

6. A credit risk report generation system comprising:
computer hardware comprising at least one computer processor configured to execute computer-executable instructions and to cause the computer hardware to perform operations defined by the computer-executable instructions;
first scorecard data stored in computer-readable storage that defines a creditworthiness model for generating a credit-worthiness score based on credit data without reference to debit data;
second scorecard data stored in computer-readable storage that defines a creditworthiness model for generating a credit-worthiness score based on debit data without reference to credit data;
third scorecard data stored in computer-readable storage that defines a creditworthiness model for generating a credit-worthiness score based on credit data and debit data;
a computer-readable storage device storing a first set of computer-executable instructions that, if executed by the computer processor, causes the computer hardware to receive financial data about a consumer, wherein the financial data comprises at least credit data or debit data;
a computer-readable storage device storing a second set of computer-executable instructions that, if executed by the computer processor, causes the computer hardware to assess the financial data;
a computer-readable storage device storing a third set of computer-executable instructions that, if executed by the computer processor, causes the computer hardware to select, based at least in part on the assessment of the financial data, the first scorecard data, the second scorecard data, or the third scorecard data;
a computer-readable storage device storing a fourth set of computer-executable instructions that, if executed by the computer processor, causes the computer hardware to generate a credit-worthiness score by applying the financial data to the selected scorecard data; and
a computer-readable storage device storing a fifth set of computer-executable instructions that, if executed by the computer processor, causes the computer hardware to provide a credit risk report that comprises the credit-worthiness score.

7. The system of claim 6, wherein the third set of computer-executable instructions causes the computer hardware to select the second scorecard data when the financial data does not include any credit data.

8. The system of claim 6, wherein the third set of computer-executable instructions causes the computer hardware to select the first scorecard data when the financial data does not include any debit data.

9. The system of claim 6, wherein the third set of computer-executable instructions causes the computer hardware to select the third scorecard data when the financial data includes both credit data and debit data.

10. The system of claim 6, wherein the third set of computer-executable instructions causes the computer hardware to select the third scorecard data when the financial data includes credit data for a consumer that has no trade-line history.

11. The system of claim 6, wherein the first set of computer-executable instructions causes the computer hardware to receive available credit data, to assess the credit data, and to receive debit data when no credit data is available or the credit data has no trade-line history.

* * * * *